Oct. 13, 1959  E. F. FREKKO  2,908,886
TERMINAL LUG FOR A CAPACITOR OR THE LIKE
Filed Oct. 28, 1955
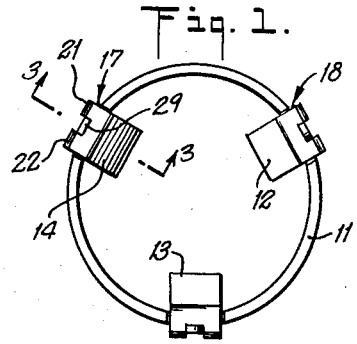
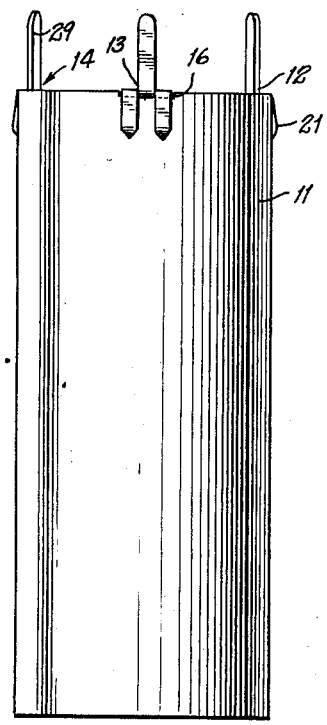
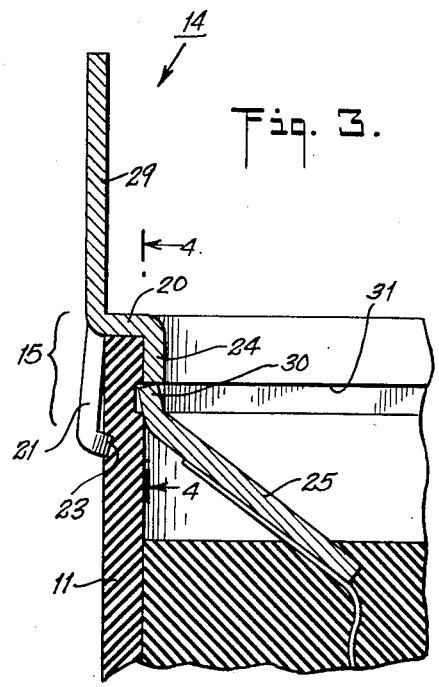
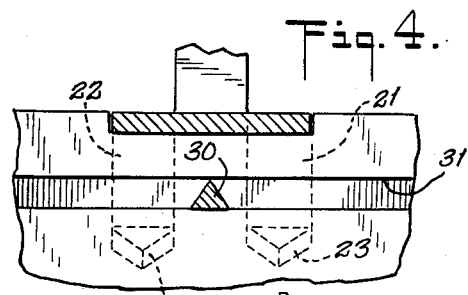
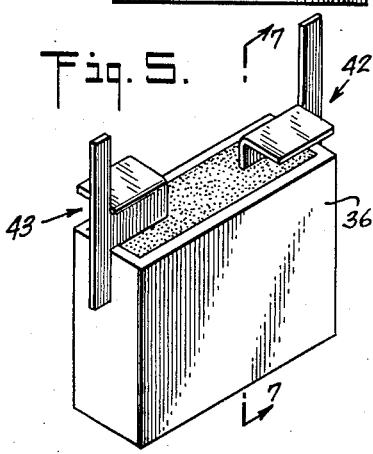
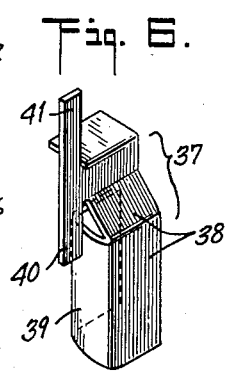
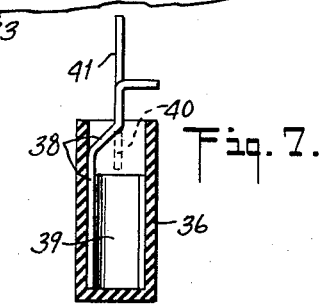
INVENTOR.
EUGENE F. FREKKO
BY
ATTORNEY

United States Patent Office 2,908,886
Patented Oct. 13, 1959

2,908,886

TERMINAL LUG FOR A CAPACITOR OR THE LIKE

Eugene F. Frekko, Westfield, N.J., assignor to Cornell-Dubilier Electric Corporation, South Plainfield, N.J., a corporation of Delaware Application October 28, 1955, Serial No. 543,337

5 Claims. (Cl. 339—220)

This invention is concerned with terminal lugs in general, and more specifically, with a terminal lug adapted for use in connection with capacitors or the like.

Since the use of printed circuits has become quite widespread and is expanding, it is important that certain of the component elements to be employed with such circuits, e.g. capacitors, should have the terminals thereof exactly located in order to match the printed circuit elements. In addition, the fact that printed circuits are mass-produced and provide means for mass-producing many types of electrical and electronic equipment, increases the desirability of providing for mass production of component elements such as capacitors. This situation presents a need for terminal lug construction that will provide an inexpensive construction while at the same time giving exact location of the lugs on the capacitor casing.

In view of the above, it is an object of this invention to provide a terminal lug construction that is simple and inexpensive, and one which may be stamped out of sheet material prior to shaping. Furthermore, the shaping of the lug is easily accomplished.

Another object of this invention is to provide a terminal lug for capacitors and the like which have an open-ended casing, and to which the lug may be easily affixed while being located in an exact position relative to the casing.

Briefly, the invention concerns a terminal lug for a capacitor or the like, wherein the capacitor has a relatively rigid open-ended casing. The invention comprises a body portion shaped for engaging the edge of said casing. Also it comprises a flange extending from said body portion on the inside of said casing for making electrical contact with said capacitor; and it also comprises a finger extending outwardly from said body portion beyond the edge of said casing for making electrical contact with a circuit.

Certain embodiments of the invention are described below by way of illustration and are illustrated in the drawings wherein like reference numerals refer to like parts throughout, and wherein:

Fig. 1 is a plan view of a capacitor casing having three terminal lugs attached thereto;

Fig. 2 is an elevation of the same capacitor casing and terminal lugs;

Fig. 3 is an enlarged cross-sectional view of a single terminal lug taken along the line 3—3 of Fig. 1;

Fig. 4 is a detailed cross-sectional view of the terminal lug taken along the line 4—4 of Fig. 3 looking in the direction of the arrows;

Fig. 5 is a perspective view showing another type of capacitor with two terminal lugs of a different type;

Fig. 6 is a perspective showing of one of the terminal lugs for use with a capacitor like that of Fig. 5; and Fig. 7 is an elevation partly in cross-section showing the relationship between the terminal lug and the capacitor casing taken along the line 7—7 of Fig. 5.

A terminal lug according to one embodiment of this invention is particularly adapted for use with a cylindrical casing style of capacitor, like that illustrated in Figs. 1 and 2. The capacitor for this style of casing fits into the hollow interior of an open-ended cylindrical casing 11 which may have a plurality of terminal lugs, e.g. three lugs 12, 13 and 14. These lugs are adapted for being constructed by stamping from sheet material and bending into the form illustrated, in any convenient manner. The casing 11 may be made of various materials depending upon the use to be made of the capacitor. One material commonly used is wax-impregnated cardboard. Other materials may include any insulators having sufficient strength.

Each of the three terminal lugs 12, 13 and 14 is identical and a description of one of them will suffice. Referring to Fig. 3 it will be observed that the terminal lug 14 is made up of a bifurcated body portion 15 which is bent so as to fit over the edge of the casing 11. Casing 11 has notches 16, 17 and 18 in the edge thereof, to receive a horizontal portion 20 of the body portion 15 of each lug. In this manner each lug may be readily positioned in an exact manner relative to the casing 11, as well as to one another.

One extension of the bifurcated body portion 15 is in turn bifurcated itself and made up of a pair of extending portions 21 and 22. Each of these extensions 21 and 22 has a bent or protruding tip 23 for providing an increased gripping action on the outside of the casing 11. This tip element 23 might be omitted where the casing 11 is constructed of a relatively hard material, such as Bakelite or the like.

The other extension of the bifurcated body portion 15 is a continuation of the horizontal portion 20, and comprises a full-width vertical extension 24 that lies generally parallel to the two separate portions 21 and 22 of the other extension making up body portion 15. Integrally connected to extension 24, there is a flange 25 which stands at an angle to the wall of casing 11 for easy access and freedom in mounting, or to aid in making electrical connection to the electrodes of the capacitor (not shown) within casing 11.

Extending outwardly beyond the end of the casing 11 and integrally attached to the body portion 15 of the terminal lug 14, there is a finger 29 that has generally parallel sides and a rounded extremity.

It will be observed that the terminal lug as thus far described may be readily slipped into place following the attachment of the electrical connection from the capacitor to the flange 25. Furthermore, the location of each terminal lug will be predetermined in an exact manner by the notches 16, 17 and 18 in the edge of casing 11 so that an exact matching with a printed circuit having predetermined dimensions may be had.

The inside extension 24 of the body portion 15 of each terminal lug may also include a protrusion 30 that is struck out of the center of extension 24, in order to produce a locking action in connection with an inner peripheral groove 31 located around the inside edge of casing 11 at a predetermined distance below the edge thereof.

In Figs. 5, 6 and 7 there is illustrated a capacitor casing 36 that is generally rectangular. This casing 36 may be a premoulded casing for miniature capacitors, such as the type shown and described in a copending application Serial No. 462,299, filed October 14, 1954. The terminal lug for use with this type of casing 36 may be likewise constructed by stamping from sheet material and shaping. However, in this instance the terminal lug differs considerably in general appearance.

In the terminal lug according to Figs. 5, 6 and 7, there is a bifurcated body portion 37 that has a relatively wide dependent extension 38. The extension 38 is provided with an extending flange portion 39, that is deformed to provide an abutting section disposed substantially perpendicular to the plane of the extension 38 and a remotely disposed section positioned substantially parallel to the plane of extension 38 (as indicated by the dotted line in the drawing) to form a socket-like portion of the terminal lug. This socket-like part is for receiving the capacitor, and for electrically connecting an electrode thereof to the terminal lug. The flange 39, together with the wide extension 38, are so shaped as to fit snugly within the casing 36 at either end thereof.

There is another relatively narrow extension 40 forming the other part of the bifurcated body portion 37. Extension 40 is designed to be located in contact with the outside of casing 36, and parallel to the side of wide extension 38 that contacts the inside of the same edge of casing 36 (when the terminal lug is in place on a casing, e.g. casing 36). It will be noted that this extension 40 is situated with its width extending generally at right angles to the surface of the casing 36. In this manner the terminal lug may be slipped into place for securely gripping the edge of the casing 36, while also being firmly supported laterally at right angles thereto by the snug fit of flange 39 and the vertical portion of extension 38 between the two long sides of casing 36. There is an outwardly extending finger 41 which acts as the connector to complete a circuit connection as desired, e.g. with a printed circuit.

It will be observed that the casing 36 supports two terminal lugs 42 and 43, one at either end thereof, while each of these lugs is identical in individual construction. In this manner ready assembly, including the fixing of terminal lugs to the capacitor casings, quickly and easily may be effectuated, while the resulting terminal lugs will have an exact location relative to the casing. Consequently, so long as the casings are maintained within a given tolerance, the terminal lugs will always maintain their relative positions for matching connections to a printed circuit, or other predetermined connections having prefixed dimensions.

While certain embodiments have been described in considerable detail in accordance with the applicable statutes, this is not to be taken as in any way limiting the invention but merely as being descriptive thereof.

It is claimed:
1. A terminal lug for an electrical instrumentality adapted to be contained within a relatively rigid open-ended casing comprising a unitary sheet material element having a relatively wide body portion shaped for engaging the marginal edge of said casing, said body portion being bifurcated to form a pair of substantially parallel dependent gripping extensions engaging the exterior and interior surfaces of said casing adjacent the marginal edge thereof, a flange extending from said interior surface engaging extension for electrical connection with said encased electrical instrumentality and an integral finger member extending outwardly from said body portion for external electrical connection thereto.

2. A unitary terminal lug for an electrical instrumentality adapted to be contained within a relatively rigid open-ended casing comprising a generally U-shaped body portion having a base section sized to abut the casing end and a pair of substantially parallel dependent gripping extensions spaced to compressively engage the exterior and interior surfaces of the casing adjacent the open end thereof, the exterior surface engaging extension being of bifurcated character, the interior surface engaging extension having an angularly disposed extending dependent flange portion for electrical connection to said encased electrical instrumentality and a finger member extending outwardly from the base section of said U-shaped body portion for external electrical connection thereto.

3. The terminal lug as set forth in claim 2 including protruding dependent tips on said bifurcated exterior surface engaging extension for embedment thereof in said exterior casing surface.

4. The terminal lug as set forth in claim 2 including a protrusion on said interior surface engaging extension for embedment thereof in said exterior casing surface.

5. In combination with a relatively rigid open-ended casing for housing an electrical unit, said casing having a lug receiving recess in the marginal edge of the open end thereof and having a groove on the interior surface spaced from said marginal edge and disposed substantially parallel thereto, a terminal lug comprising a unitary element constructed from sheet material and having a relatively wide generally U-shaped body portion with a base section sized to be received within said recess, said U-shaped body portion having a pair of substantially parallel dependent gripping extensions sized to engage the exterior and interior surfaces of said casing adjacent the open end thereof, the exterior surface engaging extension being of bifurcated character, the interior surface engaging extension having an angularly disposed extending dependent flange portion for electrical connection to said encased electrical unit, a protrusion on said interior surface engaging extension positioned to be disposed within said groove when said base section of said body portion is disposed within said recess and a finger member extending outwardly from the base section of said U-shaped body portion for external electrical connection thereto.

References Cited in the file of this patent
UNITED STATES PATENTS

| | | |
|---|---|---|
| 2,150,388 | Martindell | Mar. 14, 1939 |
| 2,229,989 | Roby | Jan. 28, 1941 |
| 2,445,587 | Sims | July 20, 1948 |
| 2,768,362 | Garretson | Oct. 23, 1956 |